Patented Dec. 15, 1936

2,064,701

UNITED STATES PATENT OFFICE 2,064,701

MANUFACTURE OF RICE FLAKES

Einar O. Stokkebye, Goteborg, Sweden

No Drawing. Application December 14, 1934,
Serial No. 757,587. In Sweden November 10,
1934

8 Claims. (Cl. 99—80)

This invention relates to a method of preparing flakes of ordinary shelled rice. It is known to prepare flakes of a plurality of cereals such as maize, oat, wheat et cetera. The object of making flakes of grains is to reduce the time of preparing foods of the grains to a minimum.

Maize, oats or wheat or similar cereals, usually are flaked by a process wherein the grain at a temperature of about 212° F. is treated for a rather short time with moisture, generally supplied in the form of steam which is introduced into the mass of grains. Sometimes the material will be dampened before its heating or "cooking". The "cooking" increases the softness and plasticity of the grains, so that the following operation consisting in passing the grains between revolving rollers makes it easy to complete the flakes. Sometimes, however, the "cooking" makes the grains so sticky, that they smear the rollers, if they were rolled immediately after the cooking procedure, hence a quick drying of the surfaces of the grains is necessary before rolling.

The time of "cooking" varies between three and twenty minutes which time suffices to get the said cereals in the appropriate condition for rolling, because a longer time would make the grains too sticky and cause them to become slimy, resulting in an unserviceable mass. Generally speaking, the cooking time depends principally upon the quality of the cereals so that for ordinary wheat and oats very often three minutes suffice; and only rather hard grains will stand such a long cooking time as twenty minutes.

Attempts to apply the experience from other cereals to rise when making flakes thereof hitherto have failed, and nobody before has succeeded in producing a commercial article of rice flakes notwithstanding the demand for such goods. A thorough investigation of the causes of these failures has shown that they are to be found in the mechanical and physical properties of the rice as well as that the chemical structure of rice differs essentially from that of other cereals, which on the contrary are rather similar to each other in these respects.

A cooking time of three to twenty minutes with a supply of such qualities of steam or water as a sufficient for, for instance maize, leaves the interior of rice grains still too hard and brittle so that they break down into powder when rolled. In the outer regions, on the contrary, the starch has been so much modified that it forms a sticky paste which adheres to the rollers and renders it impossible to produce an article fit for trade.

If the cooking time be increased to some sixty minutes the interior of the rice grains, certainly, will be sufficiently softened or "cooked" so that the grains may be rolled without breaking down to powder, but the pasty or smearing character of their surfaces has been very increased so that the rolling will be still more impossible to carry out, and the rollers become covered by a sticky paste.

Further experiments, however, have shown that rice flakes can be obtained of an extraordinary high class concerning their appearance, durability, flavour and usefulness so that such rice flakes are to be looked upon as an irreproachable article of trade. The improved method of manufacture is characterized therein that the rice prior to its being rolled into flakes is treated with moisture and heat between certain rather narrow limits viz. with a comparatively low degree of moisture and during a comparatively long time. The expression "comparatively" taken in comparison with what is usual with reference to other cereals.

The humidity of the rice in this respect means the moisture which remains in the rice after completing of the treating under heat compared with the total weight of the product in this condition.

The moisture may be supplied in different ways. When and how the moisture is to be supplied depends upon the quality of rice to be treated, how moist the grains were prior to the beginning of the treatment, and how far one desires to carry out the rolling into flakes as well as on several other reasons which cannot all be mentioned but must be taken in consideration in each case. The general limits, however, of cooking time and humidity will be specified here below on the express understanding that when these limits are passed either up or down the result will be of such an inferior quality that I do not find it worth while to prevent anybody else from the free use of such methods.

For instance, part of the moisture can be supplied to the grains in a closed vessel previous to the beginning of the heating process either in a separate vessel or in the same vessel in which the heating process will be carried out later on. Also, it is possible that the moisture may be partly or entirely supplied as steam blown into the heat treating vessel. In order to regulate the quantity of condensate within the mass in the vessel under these conditions, said vessel may be heated from outside by means of electricity or hot air or by the aid of a steam jacket or in other known ways. In this case, the entire heat necessary to raise the temperature of rice can be supplied through the walls of the vessel.

The heating time must be at least thirty minutes, and in certain cases a considerably longer time is necessary to obtain the appropriate softness through the entire body of the grain, and the temperature must be raised to a height of between some 165 and 265 degrees Fahrenheit. A lower temperature does not cause the necessary softness of the rice and a higher temperature will make the mass sticky and pasty. The dampness must be adjusted so far that the humidity of the goods at the end of the heat treatment will not exceed 20 per cent of the total weight of the product. To obtain this degree of humidity the quantity of moisture supplied must be subject to the humidity of the raw rice as well as to the quantity of water that will escape during the heating process. The heating process, thus, must be carried out under such conditions that any excess of moisture is allowed to escape as also that the free communication with the surrounding air can be shut off, if the humidity would be lower than desired.

Generally, a dampness of some 16 to 19 per cent will suffice.

The rolling into flakes is carried out directly after the end of the heat treatment but in any case without cooling or drying of the rice.

The comparatively long cooking time in combination with a small degree of dampness causes such an alteration of the physical properties of the rice that the rice can be rolled to flakes without being crushed to powder or smearing the rollers. The flakes obtain a nice porcelain like semi-transparent appearance, and the flakes may be dried so as to increase their durability when stored. Also they can be roasted, whereby an article of other flavour and appearance is obtained.

In order to vary the flavour one may supply more or less of the moisture in the state of an emulsion or solution or suspension in water of various ingredients such as sugar, salt, fat, spices or such taste improving means.

If the combined treatment with moisture and heat has been carried out in the correct way, the rice corns will swell very little only, on the surface they will be felt rather dry, and they may be scored without difficulty by the nails. A comparatively large pressure on the rollers must be used when rolling the corns into flakes.

What I claim is:

1. The process of manufacturing rice flakes which comprises heating rice grains at a temperature between about 165 degrees and 265 degrees Fahrenheit for a time of at least thirty minutes in an atmosphere saturated with steam and compressing the product when having a humidity of at most 20% into flakes while it is at the said temperature.

2. The process of manufacturing rice flakes which comprises heating grains of shelled rice for at least thirty minutes at a temperature of about 212° F. in the presence of sufficient moisture to give the product a moisture content of at most 20 per cent, then rolling the said product into thin flakes while at the said temperature and containing the said amount of moisture.

3. The process of manufacturing rice flakes which comprises heating grains of shelled rice for at least thirty minutes at a temperature of from 165° to 265° F. in the presence of sufficient moisture to give the product a moisture content of at most twenty per cent, then rolling the said product into thin flakes while at the said temperature and containing the said amount of moisture.

4. The process of manufacturing rice flakes which comprises heating grains of shelled rice for at least thirty minutes at a temperature of about 212 degrees F. in the presence of sufficient moisture to give the product a moisture content of at most twenty per cent, then compressing the said product into thin flakes while at the said temperature and content of moisture.

5. The process of manufacturing rice flakes which comprises heating grains of shelled rice for at least thirty minutes at a temperature of from 165° to 265° F. in the presence of sufficient moisture to give the product a moisture content of at most twenty percent, then immediately compressing said product into thin flakes.

6. The process of claim 5 in which each flake represents a single grain of rice.

7. The process of claim 3 in which the heat is at least partially obtained from a source other than that imparted by the moisture.

8. The process of manufacturing rice flakes consisting in heating husked grains of rice in the presence of moisture for a period of at least thirty minutes to a temperature of approximately 100° C. so that at the end of this treatment the grains have been given a moisture content of at most twenty per cent of the total weight, and then when the grains are in the said heated and moistened condition subjecting them to a rolling and flattening action so that each grain is flattened to the shape of a thin flake thereby avoiding crushing of the cereals and the clogging of the flakes obtained.

EINAR O. STOKKEBYE.